3,200,789
PERCH FOR BIRD CAGE
Charles A. Danowitz, 145 Markle St., Philadelphia, Pa.
Filed Apr. 20, 1964, Ser. No. 360,973
4 Claims. (Cl. 119—25)

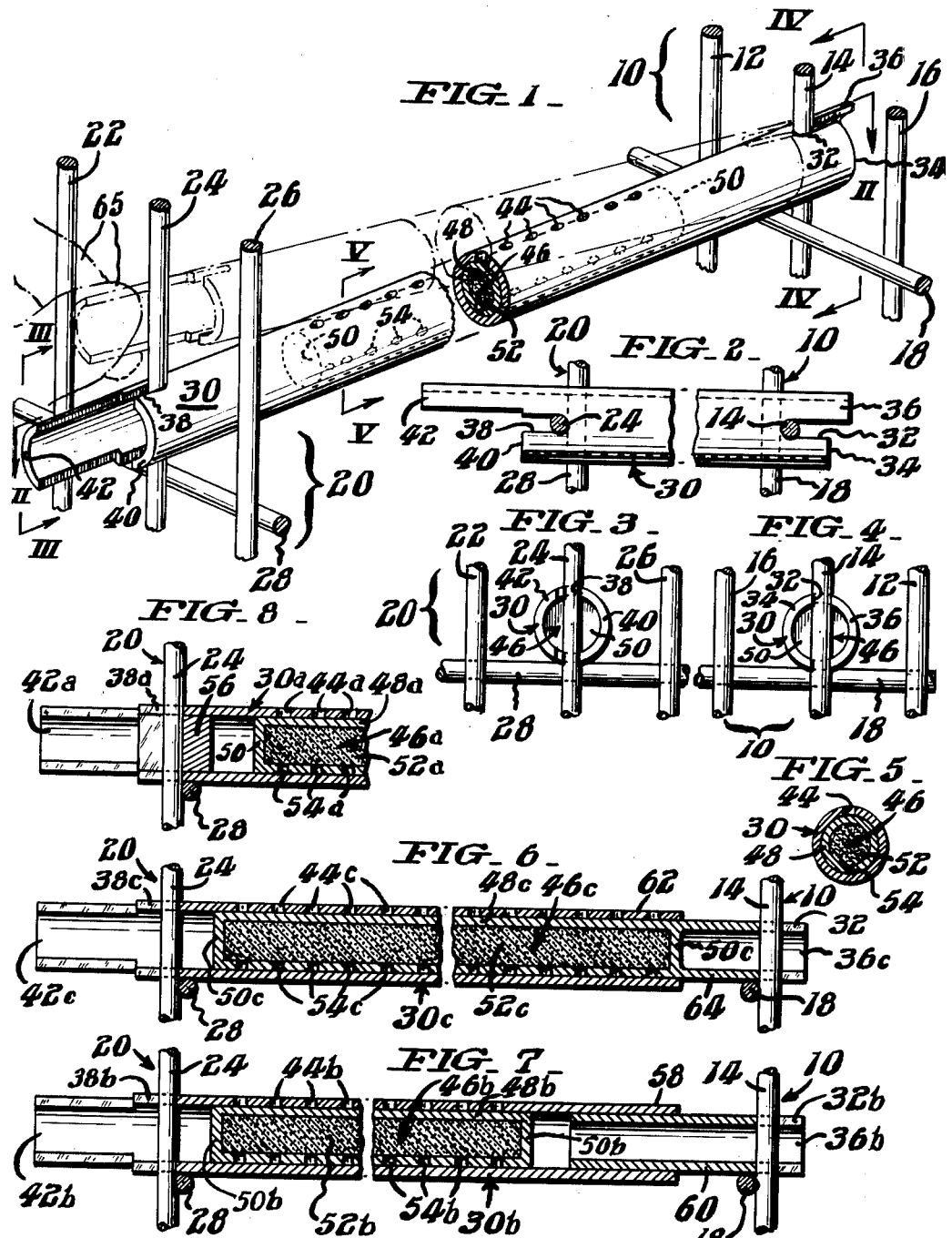

This invention relates to perches for bird cages.

An important object of the invention is to provide a perch which may be mounted in position and removed from the cage from outside the cage.

Another object is to provide such a perch with a finger grip at one end, and with means to facilitate maneuvering the opposite end into position.

Another object is to provide such a perch which may be loaded with a chemical cartridge which gives off mite and lice killing fumes that envelop a bird standing on the perch.

Another object is to provide such a perch which has a variable effective length.

Other objects of the invention will become apparent when the following description is read with reference to the accompanying drawing, in which:

FIG. 1 is a perspective view of a perch constructed in accordance with the invention and mounted between the walls of a wire cage;

FIG. 2 is a horizontal section on line II—II in FIG. 1;

FIGS. 3 and 4 are opposite end views of the perch, indicated by lines III—III and IV—IV in FIG. 1;

FIG. 5 is a section on line V—V in FIG. 1;

FIG. 6 is a longitudinal section through a modified form of the perch;

FIG. 7 is a longitudinal section through another modified form of the perch; and FIG. 8 is a fragmentary longitudinal section through still another modified form of the perch.

The following description is directed to the specific form of the invention illustrated in the drawing and is not addressed to the scope of the invention, which may be practiced in a variety of forms.

A wall of the cage, generally designated 10, comprises vertically extending laterally spaced wires 12, 14 and 16, and a horizontally extending wire tie 18. Another wall of the cage, generally designated 20, comprises vertically extending laterally spaced wires 22, 24 and 26, and a horizontally extending wire tie 28.

The perch is in the form of a tubular member, generally designated 30. The right-hand end of the member 30 is provided with a diametrically extending notch 32 having at one side thereof an end portion 34 and on the opposite side thereof an end portion 36, the end portion 36 being longer than the end portion 34 for a purpose to appear. The left-hand end of the member 30 is provided with a diametrically extending notch 38 having on one side thereof an end portion 40 and on the opposite side thereof an end portion 42, the end portion 42 being longer than the end portion 40 to provide a finger grip. The notches 32 and 38 are substantial in depth, and the distance between the bases of the notches 32 and 38 is equal to the clear distance between wires 14 and 24. Longitudinally spaced along the top of the member 30 is a series of apertures 44 for a purpose to appear.

Slidably fitted into the tubular member 30 is a chemical cartridge, generally designated 46. The cartridge is provided with a cylindrical wall or jacket 48 and opposite end walls 50. The cartridge is filled with a suitable chemical 52, and extending along the cylindrical wall 48 of the jacket is a series of apertures 54 for a purpose to appear.

Referring particularly to FIG. 8, if desired, the opposite end portions of the member 30a may be stopped, as by plugs 56.

Referring particularly to FIG. 7, the modified perch 30b is similar to the embodiment of FIGS. 1 to 5, except that the tubular member is made in two sections 58 and 60 telescoped one into the other, as shown.

Referring particularly to FIG. 6, the modified perch 30c is similar to the embodiment shown in FIGS. 1 to 5, except that, as in the embodiment of FIG. 7, the tubular member is made in two sections 62 and 64 telescoped one into the other, and the cartridge is made integral with the section 64.

In the use of the exemplary perch shown in FIGS. 1 to 5, the cartridge 46 is inserted into the tubular member 30 endwise through one end thereof. The operator grasps the finger grip 42 with his fingers 65 and inserts the member 30 endwise between the wires 22 and 24, above the wire 28. The end portion 36 at the right-hand end of the member 30 is then positioned in side abutting relation to the wire 14, above the wire 18. With the left-hand end of the member 30 held high above the wire 28 the member 30 is inserted farther into the cage for full engagement of the wire 14 in the notch 32. With the wire 14 as a pivot, the member 30 is swung around so that notch 38 is aligned with the wire 24. Then the left-hand end of the member 30 is lowered for full engagement of the wire 24 in notch 38. In the final position of the perch, the right-hand end thereof rests on wire 18 and the left-hand end thereof rests on the wire 28.

Fumes issue from the cartridge through apertures 54 and pass through apertures 44 in the top of the member 30 to envelop a bird standing on the perch or member 30. The apertures 44 are located along the top of the member 30 to keep the claws of the bird from being caught in them. To remove the perch, the finger grip 42 is grasped and the left-hand end of the member 30 is raised to disengage it from the wire 24. With the wire 14 as a pivot, the member 30 is swung around and from the cage through the wires 22 and 24.

Preferably, the perch is made of disposable material and is used once, then thrown away.

Referring particularly to FIG. 8, the modified perch is used in the same way as the embodiment of FIGS. 1 to 5, except for insertion of the plugs 56 respectively into the opposite ends of the member 30a.

Referring particularly to FIGS. 6 and 7, the use of the modified perches is the same as in the case of the embodiment of FIGS. 1 to 5, except that the effective length of the perch may be varied to suit the distance between the walls 10 and 20 of the cage.

The use of a chemical cartridge, of course, is optional. It will be noted that the perch is placed in position and removed therefrom wholly from without the cage.

The perch, of course, may be round, oval or ellipsoid in transverse section.

What is claimed is:

1. In a perch for open wire type bird cages, the combination comprising a round tubular member provided with a series of longitudinally spaced apertures along the top side thereof and notched at both ends for receiving respectively a pair of wires of the cage, the end portion of said member on one side of at least one of said notches being substantially longer than the end portion of said member on the opposite side of said notch thereby to provide a finger grip by means of which the perch may be held, projected endwise through one side of and across the cage and maneuvered into engagement with said pair of wires, and by means of which the perch may be removed from the cage, all from without the cage, and a round cartridge slidably projected endwise into said tubular member, said cartridge being loaded with an agent which generates fumes such as will at least repel if not destroy mites and lice and similar vermin, said cartridge being provided with a jacket impervious to said fumes and having a series of apertures along the length thereof through which said fumes may pass freely for subsequent passage through said apertures in the top of the tubular member for enveloping a bird perched on said tubular member.

2. In a perch for open wire type bird cages, an elongated member having open notches extending across opposite end portions thereof and adapted for receiving respectively a pair of cage wires, the portion of said member on one side of one notch being substantially longer than the portion of said member on the opposite side of the notch thereby to provide an abutment to facilitate operative engagement thereof with a cage wire, and the portion of said member on one side of the other notch being substantially longer than the portion of said member on the opposite side of the notch thereby to provide a finger grip by means of which the perch may be held, projected endwise through one side of and across the cage and maneuvered into engagement with said pair of wires, and by means of which the perch may be removed from the cage, all from without the cage.

3. In a perch for open wire type bird cages, a tubular member having open notches extending across opposite end portions thereof and adapted for receiving respectively a pair of cage wires, the portion of said member on one side of one notch being substantially longer than the portion of said member on the opposite side of the notch thereby to provide a finger grip by means of which the perch may be held, projected endwise through one side of and across the cage and maneuvered into engagement with said pair of wires, and by means of which the perch may be removed from the cage, all from without the cage, means closing the opposite end portions of said tubular member, and a cartridge within said tubular member and disposed between said closures including an agent which generates fumes that will at least repel if not destroy mites and lice and similar vermin, and a jacket encasing said agent, said jacket and the top of said tubular member being adapted for passage of said fumes therethrough for enveloping a bird perched on said tubular member.

4. In a perch for open wire type bird cages, a tubular member having two sections telescoped one into the other, the two remote end portions respectively of said tubular sections having open notches extending thereacross and adapted for receiving respectively a pair of cage wires, the portion of one tubular section on one side of the associated notch being substantially longer than the portion of said tubular section on the opposite side of the notch thereby to provide a finger grip by means of which the perch may be held, projected endwise through one side of and across the cage and maneuvered into engagement with said pair of wires, and by means of which the perch may be removed from the cage, all from without the cage, axially spaced means within the inner one of said tubular sections forming therein a compartment within the outer one of said tubular sections, and an agent within said compartment, which agent generates fumes that will at least repel if not destroy mites and lice and similar vermin, said compartment and the top of said outer tubular section being adapted for passage of said fumes therethrough for enveloping a bird perched on said tubular member.

References Cited by the Examiner

UNITED STATES PATENTS

| | | | |
|---|---|---|---|
| 1,047,697 | 12/12 | Pond | 119—25 |
| 1,209,462 | 12/16 | Mack | 119—25 |
| 2,240,631 | 5/41 | Stewart | 119—26 |

SAMUEL KOREN, *Primary Examiner.*

HUGH R. CHAMBLEE, *Examiner.*